United States Patent
Amurri

(10) Patent No.: US 10,042,349 B2
(45) Date of Patent: Aug. 7, 2018

(54) METHOD AND EQUIPMENT FOR CONTROLLING A MANUFACTURING PROCESS OF A COMPONENT OF A TYRE FOR VEHICLE WHEELS

(71) Applicant: PIRELLI TYRE S.P.A., Milan (IT)

(72) Inventor: Cesare Emanuele Amurri, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 128 days.

(21) Appl. No.: 15/129,724

(22) PCT Filed: Mar. 24, 2015

(86) PCT No.: PCT/IB2015/052152
§ 371 (c)(1),
(2) Date: Sep. 27, 2016

(87) PCT Pub. No.: WO2015/150970
PCT Pub. Date: Oct. 8, 2015

(65) Prior Publication Data
US 2017/0176970 A1    Jun. 22, 2017

(30) Foreign Application Priority Data

Apr. 2, 2014 (IT) ............................. MI2014A0585

(51) Int. Cl.
*G06F 19/00* (2018.01)
*G05B 19/402* (2006.01)
(Continued)

(52) U.S. Cl.
CPC ....... *G05B 19/402* (2013.01); *B29D 30/0061* (2013.01); *B29D 30/28* (2013.01);
(Continued)

(58) Field of Classification Search
CPC ................ G05B 19/402; G05B 19/182; G05B 2219/45152; B29D 30/28; B29D 30/3021; B29D 30/0061; B29K 2021/00
See application file for complete search history.

(56) References Cited

U.S. PATENT DOCUMENTS 6,972,063 B2    12/2005   Caretta et al.
9,434,115 B2 *   9/2016   Cantu' .................... B29D 30/14
(Continued)

FOREIGN PATENT DOCUMENTS

CN        101068675 A      11/2007
CN        102481740 A       5/2012
(Continued)

OTHER PUBLICATIONS

International Search Report from the European Patent Office for International Application No. PCT/IB2015/052152, dated Jul. 15, 2015.
(Continued)

*Primary Examiner* — Michael D Masinick
(74) *Attorney, Agent, or Firm* — Finnegan, Henderson, Farabow, Garrett & Dunner, L.L.P.

(57) ABSTRACT

A method and equipment for controlling a manufacturing process of a component of a tire for vehicle wheels, wherein at least one continuous elongated element fed by a supplying member is placed on a forming support by means of at least one pressing member active on the at least continuous elongated element along an application direction. During the manufacturing of the component of the tire, at successive sampling times $T_i$, the value $P_i$ of a quantity indicative of the position of the pressing member is acquired along the application direction, where i is an integer greater than or equal to 1, $T_i = i*1/f$, and f is the sampling frequency.

28 Claims, 6 Drawing Sheets

(51) Int. Cl.
  *B29D 30/30* (2006.01)
  *B29D 30/28* (2006.01)
  *B29D 30/00* (2006.01)
  *G05B 19/18* (2006.01)
  *B29K 21/00* (2006.01)

(52) U.S. Cl.
  CPC ....... *B29D 30/3021* (2013.01); *G05B 19/182* (2013.01); *B29K 2021/00* (2013.01); *G05B 2219/45152* (2013.01)

(56) References Cited

U.S. PATENT DOCUMENTS

| | | | |
|---|---|---|---|
| 9,738,044 B2* | 8/2017 | Marchini | B29D 30/24 |
| 2001/0042586 A1* | 11/2001 | Caretta | B29D 30/0016 156/130 |
| 2002/0124935 A1* | 9/2002 | Caretta | B29D 30/18 156/123 |
| 2006/0090836 A1* | 5/2006 | Caretta | B29C 47/0002 156/117 |
| 2006/0254694 A1* | 11/2006 | D'Oria | B29C 47/0019 156/117 |
| 2008/0269941 A1 | 10/2008 | Cantu' et al. | |
| 2009/0101264 A1* | 4/2009 | Lo Presti | B29D 30/30 152/510 |
| 2009/0188607 A1 | 7/2009 | Tatara et al. | |
| 2009/0266489 A1 | 10/2009 | Koyama | |
| 2009/0283203 A1 | 11/2009 | Marchini et al. | |
| 2012/0111461 A1 | 5/2012 | Amurri et al. | |
| 2012/0216942 A1 | 8/2012 | Badolato et al. | |
| 2013/0206340 A1 | 8/2013 | Tatara et al. | |
| 2013/0220517 A1 | 8/2013 | Vignon et al. | |
| 2014/0144574 A1* | 5/2014 | Portinari | B29D 30/005 156/110.1 |
| 2017/0176970 A1* | 6/2017 | Amurri | G05B 19/402 |
| 2017/0282471 A1* | 10/2017 | Marchini | B29D 30/305 |

FOREIGN PATENT DOCUMENTS

| | | |
|---|---|---|
| CN | 102712154 A | 10/2012 |
| EP | 1 820 629 | 8/2007 |
| EP | 2 119 555 | 11/2009 |
| JP | 2009061717 A | 3/2009 |
| JP | 2009269233 A | 11/2009 |
| WO | WO 01/36185 | 5/2001 |
| WO | WO 2006/059351 | 6/2006 |
| WO | WO 2011/007269 | 1/2011 |

OTHER PUBLICATIONS

Written Opinion of the International Searching Authority from the European Patent Office for International Application No. PCT/IB2015/052152, dated Jul. 15, 2015.

Office Action in counterpart Chinese Patent Application No. 201580017863.2, dated Jul. 11, 2017 (with partial translation).

Office Action in counterpart Japanese Patent Application No. 2016-558700, dated Jul. 10, 2017 (with partial translation).

* cited by examiner

METHOD AND EQUIPMENT FOR CONTROLLING A MANUFACTURING PROCESS OF A COMPONENT OF A TYRE FOR VEHICLE WHEELS

CROSS REFERENCE TO RELATED APPLICATIONS

This application is a national phase application based on PCT/IB2015/052152, filed Mar. 4, 2015, and claims the priority of Italian Patent Application No. MI2014A000585, filed Apr. 2, 2014, the content of each application being incorporated herein by reference.

BACKGROUND OF THE INVENTION

Field of the Invention

The present invention relates to a method and equipment for controlling a manufacturing process of a component of a tire for vehicle wheels. More specifically, the invention relates to a control method and equipment for detecting deposition anomalies of a continuous elongated element in a manufacturing process of a component of a tire in which the continuous elongated element, fed by a supplying member, is placed on a forming support by means of at least one pressing member active on said continuous elongated element along an application direction.

Description of the Related Art

A tire for vehicle wheels typically comprises a carcass structure, shaped according to a substantially toroidal configuration, comprising at least one carcass ply having respectively opposite end portions. The latter are engaged with respective annular anchoring structures, each of them normally formed from at least one substantially circumferential annular insert called "bead core" on which at least one filling insert is generally applied, tapering radially going away from the rotation axis. The annular anchoring structures are arranged in areas usually identified by the term "beads". The beads have an internal diameter substantially corresponding to a so-called "fitting-diameter" of the tire on a respective assembly rim.

The tire also comprises a crown structure comprising at least one belt strip arranged in a position radially outside the carcass ply with respect to the rotation axis of the tire and a tread band radially outside the belt strip. Longitudinal and transversal grooves are typically formed into the tread band, arranged to define a desired tread pattern. Between the tread band and the belt strip(s) there can be a so-called "underlayer" made of elastomeric material with suitable properties to ensure a stable connection of the belt strip(s) with the tread band itself.

The tire also comprises a pair of so-called sidewalls made from elastomeric material that represent the axially outer surfaces of the tire, with respect to a middle plane perpendicular to the rotation axis of the tire itself. For example, the sidewalls represent the axially outer surfaces with respect to the annular anchoring structures, to the carcass ply(-ies), to the belt strip(s) and possibly to at least one tread band portion.

In "tubeless" tires, there is, in a radially inner position with respect to the carcass ply, at least one layer of elastomeric material, usually called "liner", having air-tightness characteristics and generally extending from one of the beads to the other.

The production cycles of a tire provide that, after a building process in which the various structural components of the tire itself are made and/or assembled, the built green tires are transferred into a molding and vulcanizing line where a molding and vulcanization process is carried out, adapted to define the structure of the tire according to a desired geometry and tread pattern.

In the present description and subsequent claims, by the term "elastomeric material" it is meant to indicate a composition comprising at least one elastomeric polymer and at least one reinforcing filler. Preferably, such a composition also comprises additives like, for example, a cross-linking agent and/or a plasticizer. Thanks to the presence of the cross-linking agent, such a material can be cross-linked by heating, so as to form the final manufactured product.

By the term "continuous elongated element" it is meant to indicate an element made from elastomeric material, preferably made without the use of reinforcing cords, in which the longitudinal dimensions are greater than the transversal dimensions and the thickness. Preferably, the continuous elongated element is directly fed through extrusion from a suitable draw-plate/extruder. Alternatively, the continuous elongated element is fed from a reel collecting the same, as obtained beforehand by drawing/extrusion.

By the term "structural component", or simply "component" of a tire it is meant to indicate any component suitable for carrying out a function in the tire or a portion thereof, selected for example from: liner, under-liner, carcass ply(-ies), under-belt insert, crossed over or zero degrees belt strips, thin sheet for the tread band, tread band, bead core, bead filler, reinforcing inserts, made from textile, metallic or only elastomeric material, anti-abrasion insert, sidewall inserts.

By the term "application direction" it is meant to indicate the direction along which the force that keeps a pressing member pressed against a forming support acts. The terms "axial", "axially", "radial", "radially", "circumferential" and "circumferentially" are used with reference to the forming support.

In particular, by the terms "axial" and "axially" it is meant to indicate references/quantities arranged/measured or extending in a direction substantially parallel to the rotation axis of the forming support.

By the terms "radial" and "radially" it is meant to indicate references/quantities arranged/measured or extending in a direction substantially perpendicular to the rotation axis of the forming support, in other words in a direction that intersects the rotation axis of the forming support and lies in a plane comprising such a rotation axis.

By the terms "circumferential" and "circumferentially" it is meant to indicate references/quantities arranged/measured or extending in a direction parallel to a direction defined in any point of the forming support along the tangent to the forming support at that point and perpendicular to the axial direction and to the radial direction.

Conventional production processes of tires for vehicle wheels essentially provide that the components of the tire described above be pre-fabricated separately from one another, to then be assembled in a subsequent building step of the tire.

The current trend, however, is to use processes that make it possible to minimise or, possibly, eliminate the pre-fabrication and storage of such components.

More specifically, now process solutions are adopted that provide to build the single components of the tire directly onto a forming support, according to a predetermined sequence.

In WO 01/36185 to the same Applicant, the components of the tire are made on a toroidal support, by sequentially applying onto the latter a plurality of elongated elements, for example consisting of individual rubberized cords or of rubberized cords grouped in parallel in the form of strip-like elements, particularly used to make the carcass and belt structure, and continuous elongated elements made of elastomeric material, particularly used to make the other structural components of the tire like for example tread band, sidewalls, liner, fillers.

WO 2006/059351 to the same Applicant describes a method for controlling a manufacturing process of components of a tire for vehicle wheels in which an elongated element fed by a supplying member is distributed over a forming support by means of a pressing member active on the elongated element along a pressing direction. The method comprises the steps of: detecting, with a predetermined frequency, the instantaneous acceleration value of said pressing member along said pressing direction; comparing the detected value of said instantaneous acceleration with a threshold value; generating a warning signal when the detected value of said instantaneous acceleration exceeds said threshold value.

In cases of the type described in WO 01/36185 and WO 2006/059351, the production of a tire foresees an automated and substantially continuous process, in other words substantially without intermediate storage of semi-finished products. In such a process, a plurality of structural components of the tire made from elastomeric material not reinforced by cords (for example liner, under-liner, sidewalls, tread band, inserts made from elastomeric material, etc.) is manufactured, according to a predetermined sequence, from continuous elongated elements fed by a supplying member, for example a drawing plate/extruder, and then deposited on a forming support through a plurality of axially adjacent and/or radially overlapping coils, by means of at least one pressing member active on the continuous elongated element along a pressing direction.

SUMMARY OF THE INVENTION

The Applicant has observed that during the deposition of the continuous elongated element on the forming support, the position of the pressing member along the application direction undergoes continuous oscillations that depend on surface irregularities that the pressing member encounters on the forming support. Such irregularities can derive from deposition anomalies or be structural, in other words intrinsically linked to the deposition process. In the first case, they are geometric irregularities due to excess or lack of material that can derive from breaking of the continuous elongated element with a consequent lack of deposition of the extruded material in the areas foreseen by the supplying cycle; formation of discontinuities due to the presence of clots in the mix, or of short mix portions with geometry not corresponding to that expected in output from the dispensing member (that can be caused by the presence of possible burnt portions or by operating anomalies of the dispensing member); and/or formation of folds of the material, particularly in the starting step of the deposition cycle. Such geometric irregularities typically involve sudden variations of medium-high size of the position of the pressing member. In the second case, on the other hand, the irregularities may be due, for example, to previous coilings beneath the pressing member and/or variations in inclination of the forming support with respect to the pressing member. Such structural irregularities typically involve progressive variations of small size of the position of the pressing member.

A critical factor in continuous tires production processes of the type described above is identifying the aforementioned anomalies that can occur during the manufacturing of one of the structural components of the tire being formed due to an incorrect deposition of the elongated elements on the forming support. Such anomalies, indeed, can cause geometric irregularities of such a size as to require the tire being processed to be discarded.

If they are not detected during the deposition step, the irregularities can be hidden by a component deposited subsequently and therefore can no longer be detected on the finished tire. If, therefore, such irregularities are not detected during the deposition step, the manufacturing process of the tire proceeds until the molding and vulcanization steps meaning that they will then only be discovered during a final quality control carried out on the aforementioned finished tire.

The Applicant has thus felt the need to develop a method that enables to identify, during the deposition step itself, possible deposition anomalies of the aforementioned continuous elongated elements on the forming support, in order to determine, right from the deposition step, whether there are geometric irregularities due to an excess or lack of material and whether there is a need to discard the tire being processed. This, advantageously, makes it possible to avoid waste of material and unproductive use of machinery of the production plant and to ensure ever greater quality levels in tires manufactured through continuous processes of the type described above.

The Applicant has observed that the method for controlling the building process of a component of the tire described by WO 2006/059351, based on the detection of the instantaneous acceleration value of the pressing member, is sensitive to the value of the rotation speed of the forming support. Such method could therefore create reliability problems in the case of a rotation speed of the forming support that is too low or too high. In particular, in the case of speeds that are too low, the detected instantaneous acceleration could be below the threshold, also in the presence of substantial geometric irregularities; on the other hand, in the case of speeds that are too high, the detected instantaneous acceleration could be above the threshold, also in the presence of unsubstantial geometric irregularities.

The Applicant has perceived that by detecting instantaneous displacements of the pressing member in successive sampling times and considering the variable sum of a certain number of these over time, the problems described above linked to the rotation speed of the forming support can be overcome.

The Applicant has finally found that by determining, substantially continuously at successive sampling times $T_i$, the value of a mobile sum $S_i$ and comparing such a value with at least one predetermined threshold value it is possible to identify possible anomalies during the deposition step of the continuous elongated element on the forming support. More specifically, at each sampling time $T_i$, with i greater than or equal to 1, the mobile sum is obtained by adding M addends, with M greater than or equal to 2 and i greater than or equal to M, which represent differences $\Delta_i, \Delta_{i-1}, \ldots \Delta_{i-M+1}$ at sampling time $T_i$ and at the previous M−1 sampling times $T_{i-1}, \ldots T_{i-M+1}$, where the difference $\Delta_i$ represents the difference, in absolute value, between the value $P_i$ of a quantity indicative of the position of the pressing member along the application direction at sampling time $T_i$ and the value $P_{i-1}$ of said quantity at the previous sampling time $T_{i-1}$.

In a first aspect thereof, the present invention thus relates to a method for controlling a manufacturing process of a component of a tire for vehicle wheels. Preferably, at least one continuous elongated element fed by a supplying member is placed on a forming support by means of at least one pressing member active on said at least one continuous elongated element along an application direction. Preferably, it is provided an activity a) of acquiring at successive sampling times $T_i$, the value $P_i$ of a quantity indicative of the position of the pressing member along the application direction, where i is an integer greater than or equal to 1, $T_i=i*1/f$ and f is the sampling frequency.

Preferably, at each sampling time $T_i$, it is provided an activity b) of determining the difference $\Delta_i$ in absolute value between the value of said quantity $P_i$ at the sampling time $T_i$ and the value $P_{i-1}$ of said quantity at the previous sampling time $T_{i-1}$.

Preferably, at each sampling time $T_i$, it is provided an activity c) of determining the value of a mobile sum $S_i$ of M addends with M greater than or equal to 2 and i greater than or equal to M, the M addends representing said differences $\Delta_i, \Delta_{i-1}, \ldots \Delta_{i-M+1}$, at the current sampling time $T_i$ and at the previous M−1 sampling times $T_{i-1}, \ldots T_{i-M+1}$.

Preferably, it is provided an activity d) of comparing the value of the mobile sum $S_i$ determined with at least one threshold value.

The Applicant considers that the use of the mobile sum defined above makes it possible to identify the presence of the aforementioned anomalies in a simple and reliable manner. The mobile sum is, indeed, determined through operations of subtraction (for the computation of the differences $\Delta_i$) and addition that are simple to implement and suitable for being carried out even through a simple processor. Moreover, the comparison of said at least one threshold value with the value of the mobile sum $S_i$ (instead of just the value of a difference $\Delta_i$ between the value $P_i$ of the position of the pressing member at sampling time $T_i$ and the value $P_{i-1}$ at the previous sampling time $T_{i-1}$) enables to increase the sensitivity of the process. The use of many addends, indeed, makes it possible to emphasise the value of the variations in position undergone by the pressing member along the application direction and to increase the ability to discriminate the geometric irregularities due to the deposition anomalies from structural ones, intrinsically linked to the deposition process. Moreover, the use of several addends makes it possible, in the presence of an irregularity due to an excess or lack of material, to increase the probability that the comparison with said at least one predetermined threshold value be carried out based on at least one addend that is representative of the variation in position of the pressing member at such an irregularity. In other words, the probability of taking at least one sample $P_i$ that is indicative of the position of the pressing member at such an irregularity increases. Finally, in the case of irregularities, at subsequent times there are more significant displacements in the same direction that, added together, increase the value to be compared with said at least one threshold value.

In accordance with a second aspect, the invention concerns equipment for controlling a manufacturing process of a component of a tire for vehicle wheels. Preferably, the equipment comprises an apparatus for manufacturing said tire component.

Preferably, the equipment comprises at least one processor operatively associated with said apparatus.

Preferably, the apparatus comprises a supplying member configured to place a continuous elongated element on a forming support.

Preferably, the apparatus comprises a pressing member active on said continuous elongated element along an application direction so as to press said continuous elongated element on said forming support.

Preferably, the apparatus comprises a detection device operatively coupled with said pressing member and configured to supply a quantity indicative of the position of the pressing member along the application direction during the deposition of said continuous elongated element on said forming support.

Preferably, said at least one processor is configured to acquire, at successive sampling times $T_i$, the value $P_i$ of said quantity supplied by the detection device, where i is an integer greater than or equal to 1, $T_i=i*1/f$ and f is the sampling frequency.

Preferably, said at least one processor is configured so as to determine, at each sampling time $T_i$, the difference $\Delta_i$ in absolute value between the value $P_i$ of said quantity at sampling time $T_i$ and the value $P_{i-1}$ of said quantity at the previous sampling time $T_{i-1}$.

Preferably, said at least one processor is configured so as to determine, at each sampling time $T_i$ the value of a mobile sum $S_i$ of M addends with M greater than or equal to 2 and i greater than or equal to M, the M addends representing said differences $\Delta_i, \Delta_{i-1}, \ldots \Delta_{i-M+1}$, at the current sampling time $T_i$ and at the previous M−1 sampling times $T_{i-1}, \ldots T_{i-M+1}$.

Preferably, said at least one processor is configured to compare the value of the mobile sum $S_i$ determined with at least one threshold value.

In at least one of the aforementioned aspects, the invention comprises one or more of the following preferred characteristics that are described hereafter.

In a preferred embodiment, if the value of the mobile sum $S_i$ is greater than said at least one threshold value, at least one of the following actions is performed: generating a warning and/or alarm signal; checking for a possible presence of a deposition anomaly of the continuous elongated element on the forming support; checking for a possible need to discard the tire with the component being manufactured; automatically stopping the manufacturing process.

The manufacturing process can be stopped immediately or at the end of the manufacturing of the component.

In a preferred embodiment, said at least one threshold value provides for a first threshold value that is less than a second threshold value.

Preferably, the second threshold value is comprised between about 130% and about 150% of the first threshold value.

Preferably, if the value of the mobile sum $S_i$ is greater than the first threshold value and less than the second threshold value, at least one of the following actions is performed: generating a warning signal; checking for a possible presence of a deposition anomaly of the continuous elongated element on the forming support; checking for a possible need to discard the tire with the component being manufactured; stopping the manufacturing process at the end of the manufacturing of the component being manufactured.

Preferably, if the value of the mobile sum $S_i$ is greater than the second threshold value, at least one of the following actions is performed: generating an alarm signal; giving for sure the presence of a deposition anomaly of the continuous elongated element on the forming support; discarding the tire with the component being manufactured; immediately stopping the manufacturing process.

Preferably, the number M of addends of the mobile sum is 3 or 4.

In a preferred embodiment, it is provided to compare the value of the mobile sum $S_i$ with said at least one threshold value if the value of the mobile sum $S_i$ is greater than a value taken, at the current sampling time $T_i$, by a parameter $S_{max}$ that is representative of the maximum value reached by the mobile sum during the manufacturing of the tire component.

Preferably, at the start of the manufacturing of the tire component, it is provided to set to zero the value taken up by the parameter $S_{max}$.

Preferably, after the action c) and before the action d), it is provided to compare the current value of the mobile sum $S_i$ with the current value taken by the parameter $S_{max}$.

Preferably, if the value of the mobile sum $S_i$ is greater than the current value taken by the parameter $S_{max}$, it is provided to assign the parameter $S_{max}$ the current value of the mobile sum $S_i$.

Preferably, if the value of the mobile sum $S_i$ is less than or equal to the current value taken by the parameter $S_{max}$, it is provided to leave the current value taken by the parameter $S_{max}$ unchanged.

Preferably, it is provided to compare the current value taken by the parameter $S_{max}$ with said at least one threshold value.

Preferably, if the current value taken by the parameter $S_{max}$ is greater than said at least one threshold value, at least one of the following actions is performed: generating a warning and/or alarm signal; checking for a possible presence of a deposition anomaly of the continuous elongated element on the forming support; checking for a possible need to discard the tire with the component being manufactured; automatically stopping the manufacturing process.

The sampling frequency f is preferably greater than or equal to about 75 Hz.

The sampling frequency f is preferably less than about 1000 Hz.

Preferably, it is provided to rotate the forming support about its own rotation axis.

Preferably, the manufacturing of the tire component comprises supplying the continuous elongated element on the forming support for at least one complete rotation of the forming support.

Preferably, it is provided to rotate the forming support about its own rotation axis at a peripheral speed at least equal to about 0.5 m/s, more preferably at least equal to about 1 m/s.

Preferably, it is provided to rotate the forming support about its own rotation axis at a peripheral speed of less than about 5 m/s.

Preferably said tire component is made from elastomeric material not reinforced with cords.

Preferably, it is provided to repeat the actions from a) to d) for each tire component.

Preferably, said actions from a) to d) are repeated for each component of the tire made from elastomeric material not reinforced with cords.

Preferably, said at least one threshold value has an absolute value comprised between about 3 mm and about 20 mm, even more preferably it is comprised between about 5 mm and about 15 mm.

The aforementioned threshold values depend on the component of the tire being processed. For example, in the case of the tread band where the continuous elongated element is overlapped and inclined with respect to the axis of the forming support, the threshold value can be comprised between about 12 mm and about 15 mm; in the case of the under-layer, on the other hand, where the continuous elongated element is substantially deposited in mutually adjacent coils and parallel to the axis of the forming support, the threshold value can be comprised between about 5 mm and about 6 mm.

Preferably, said at least one processor is configured to generate a warning and/or alarm signal.

Preferably, said at least one processor is configured to automatically stop the apparatus for manufacturing said tire component. Preferably, said at least one processor is configured to stop the apparatus immediately or at the end of the manufacturing of the component.

Preferably, said at least one processor is located at least in part at the apparatus for manufacturing said tire component.

In a preferred embodiment, said at least one processor is located at least in part in a remote location with respect to the apparatus for manufacturing said tire component.

In a preferred embodiment, said pressing member is a rolling pressing member.

Preferably, said rolling pressing member comprises a roller adapted to rotate about its own rotation axis.

Preferably, said pressing member comprises a support device of said roller configured to move said roller according to a linear motion along said application direction.

In a preferred embodiment, said detection device is a linear transducer.

Preferably, said linear transducer is operatively coupled with said support device so as to move according to a linear motion along said application direction or a direction parallel thereto.

In a preferred embodiment, said support device of said roller comprises an air piston active on said roller.

Preferably, the roller has a diameter comprised between about 40 mm and about 60 mm. Such values advantageously make it possible to ensure an area of pressure that is sufficient to press the continuous elongated element against the forming support. The Applicant observes that a roller that is too small (in other words smaller in size than an irregularity due to excess or lack of material) pushed on the forming support could jam and become damaged when it encounters the irregularity. Finally, the Applicant observes that a roller that is too large would cause a loss of sensitivity and precision of the method according to the invention. In a preferred embodiment, said supplying member comprises an extrusion head. Preferably, said supplying member comprises an extruder that continuously feeds said continuous elongated element with a volumetric flow rate comprised between about 2 cm$^3$/s and about 50 cm$^3$/s.

More preferably, said volumetric flow rate is comprised between about 5 cm$^3$/s and about 40 cm$^3$/s.

Preferably, said forming support is a toroidal or cylindrical support.

Preferably, said forming support is substantially rigid.

BRIEF DESCRIPTION OF THE DRAWINGS

Further characteristics and advantages of the present invention will be made clear from the following detailed description of some illustrative embodiments thereof, provided solely as non-limiting examples, said description being made with reference to the attached drawings, in which.

DETAILED DESCRIPTION OF THE INVENTION

Figure 1:
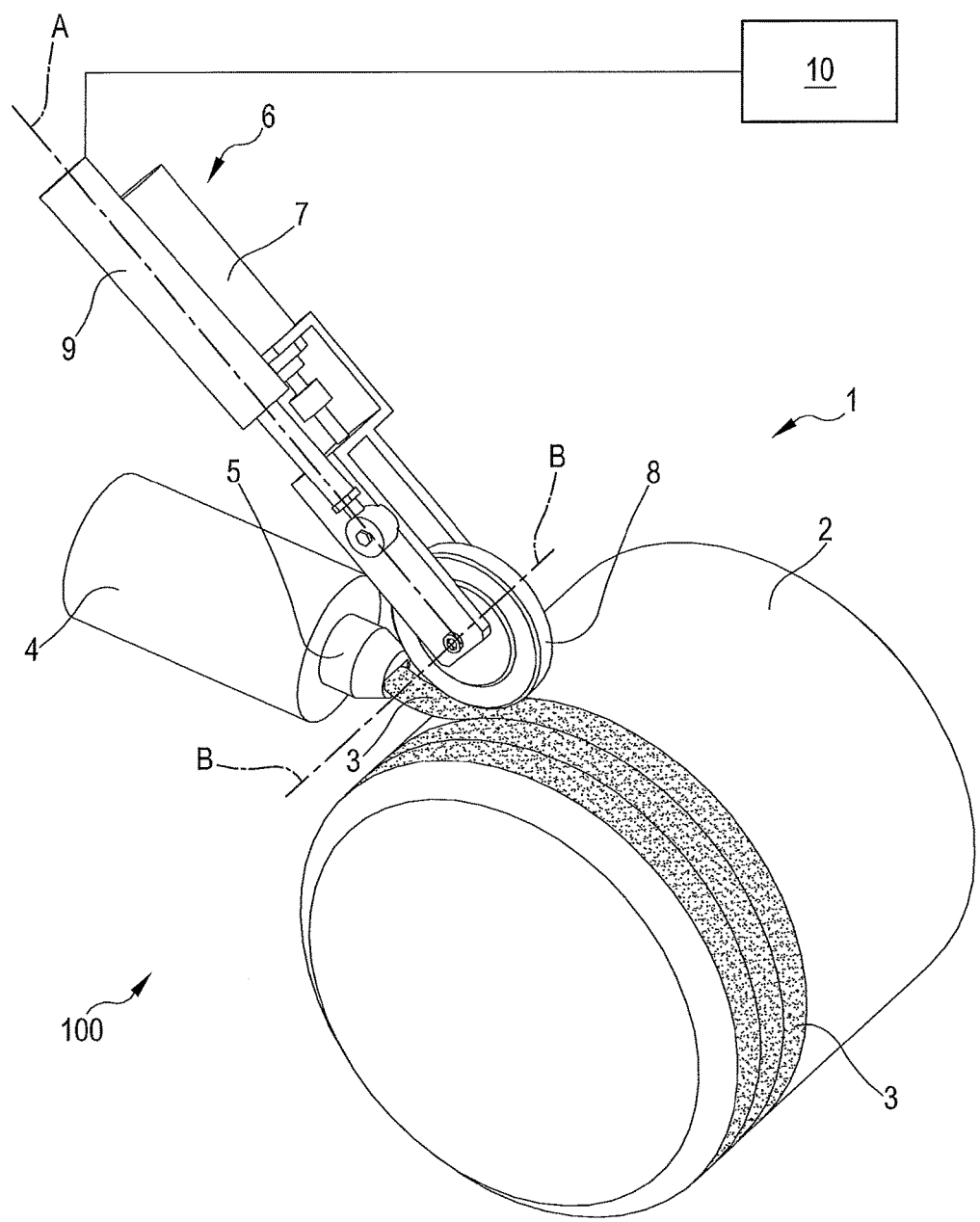
FIG. 1 shows a schematic perspective view of a preferred embodiment of equipment according to the invention.

FIG. 1 shows equipment 100 for controlling a manufacturing process of a component of a tire for vehicle wheels, comprising an apparatus 1 for manufacturing said tire component and at least one processor 10 operatively associated with a said apparatus 1.

More specifically, the apparatus 1 is part of a work station (not shown) of a tire production plant (not shown) of the type described above, in which the production of a tire takes place in a plurality of work stations through an automated and substantially continuous process, in other words at least without intermediate storage of semi-finished products made from elastomeric material not reinforced with cords. In such a process, structural components of the tire made from elastomeric material not reinforced with cords (for example liner, under-liner, sidewalls, tread band, inserts made from elastomeric material, etc.) are made directly on a forming support 2 from a continuous elongated element 3.

The forming support 2 is preferably a substantially toroidal or cylindrical rigid support.

The apparatus 1 comprises a supplying member 4 configured to deposit the continuous elongated element 3 on the forming support 2. In the embodiment illustrated in FIG. 1, the supplying member 4 is in the form of an extruder (only partially shown) equipped with an extrusion head 5 adapted to supply the continuous elongated element 3.

During the manufacturing of a tire component, the continuous elongated element 3 is fed substantially continuously by the aforementioned supplying member 4, which preferably maintains a flow rate comprised between about 2 cm$^3$/s and about 50 cm$^3$/s, more preferably between about 5 cm$^3$/s and about 40 cm$^3$/s. Said values regulate the rotation speed of the forming support 2 about its own rotation axis, said speed preferably varying between about 90 and about 120 revolutions per minute. Preferably, the peripheral speed of the forming support 2 is at least equal to about 0.5 m/s and less than about 5 m/s.

The apparatus 1 also comprises a pressing member 6 configured so as to press the continuous elongated element 3 on the forming support 2 along an application direction A. In the illustrated preferred embodiment, the application direction A forms a predetermined acute angle with the radial relative to the forming support 2 at the contact point between the pressing member 6 and the forming support 2. In the illustrated preferred embodiment, the pressing member 6 comprises a roller 8 and a support device 7 of the roller 8. The support device 7 is configured so as to move the roller 8 according to a linear motion along the application direction A. The roller 8 is also hinged to the support device 7 so as to be able to rotate about a respective pivot axis B-B.

The roller 8 acts as a pressing element for the deposition of the elongated element 3 on the forming support 2. The support device 7 comprises, for example, an air piston active on said roller 8 configured so as to keep it pressed against the forming support 2 along the application direction A.

The roller 8 preferably has a diameter comprised between about 40 mm and about 60 mm, preferably equal to about 50 mm.

The apparatus 1 also comprises a linear transducer 9 operatively coupled with the pressing member 6. The linear transducer 9 is configured to provide said at least one processor 10 with a quantity indicative of the position of the roller 8 along said application direction A during the deposition of said continuous elongated element 3 on the forming support 2.

Said at least one processor 10 can be located at least in part in the work station where the apparatus 1 is located and/or at least in part in a remote location.

Said at least one processor 10 can, for example, comprise a Programmable Logic Controller (PLC).

As already explained above, during the deposition of the continuous elongated element 3 on the forming support 2, the position of the roller 8 along the application direction A undergoes continuous oscillations that depend on surface irregularities that the roller 8 encounters on the forming support 2. Such irregularities can derive from deposition anomalies or be structural, in other words intrinsically linked to the deposition process.

Figure 2:
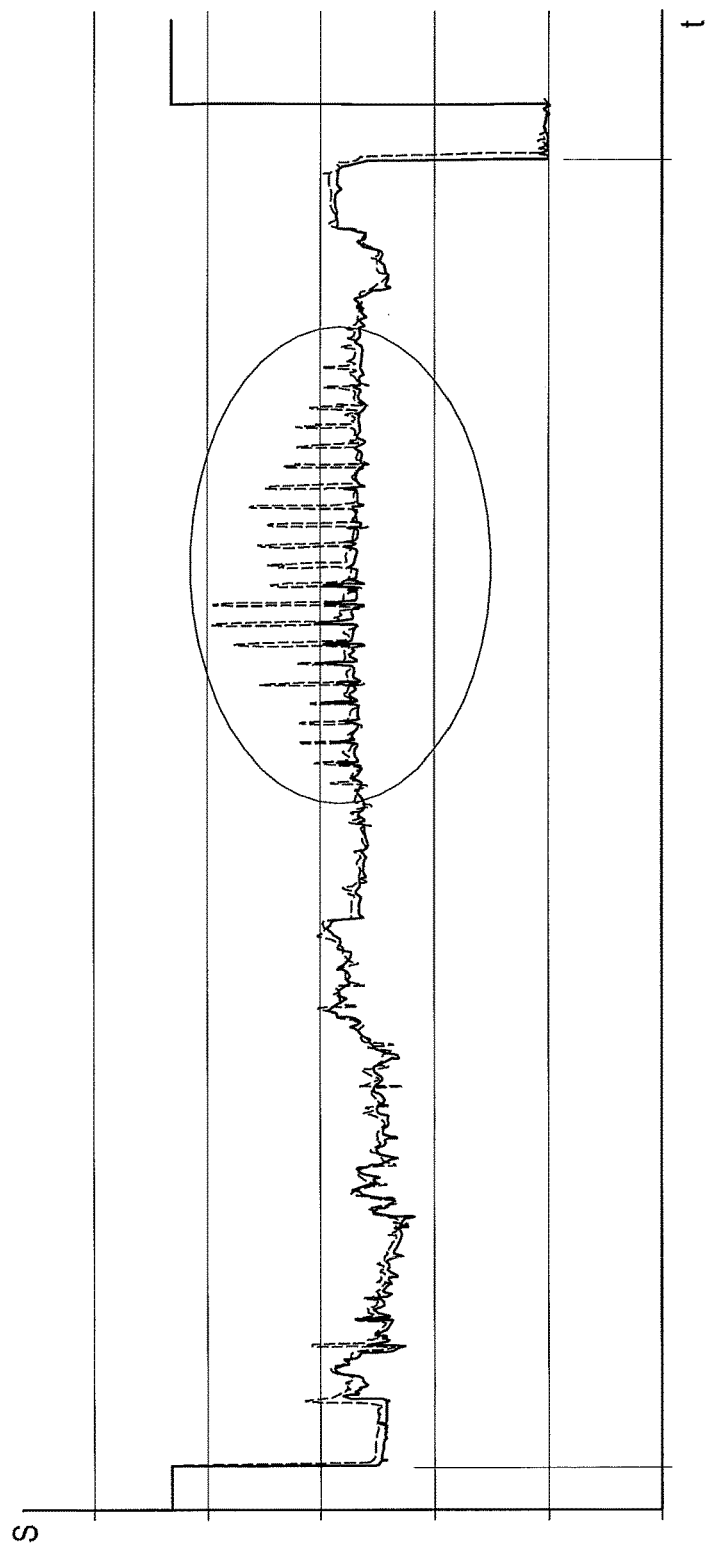
FIG. 2 schematically shows an example of the variation of the position of the roller of the apparatus comprised in the equipment of FIG. 1, along an application direction A, during the manufacturing of a tire component.

An example of such oscillations is schematically shown in FIG. 2, where the variation of the displacement s of the roller 8 along the application direction A is illustrated as a function of time t during the manufacturing of said tire component. The solid and broken lines show the variation of the displacement of the roller 8 in a situation of absence and presence, respectively, of deposition anomalies. The circled part highlights the variation of the displacement s in the presence of deposition anomalies.

Said at least one processor 10 is configured to identify possible deposition anomalies of the continuous elongated element 3 on the forming support 2 during the manufacturing of said tire component in the work station.

In particular, said at least one processor 10 comprises hardware and/or software and/or firmware elements configured to carry out the control method according to the invention during the manufacturing of said tire component in the work station. Such a method provides to acquire, at successive sampling times $T_i$, the value $P_i$ of the quantity supplied by the linear transducer 9, indicative of the position of the roller 8 along the application direction A, where i is an integer greater than or equal to 1, $T_i=i*1/f$ and f is the sampling frequency. The method also provides to determine, at each sampling time $T_i$:

the difference $\Delta_i$ in absolute value between the value of said quantity $P_i$ at sampling time $T_i$ and the value $P_{i-1}$ of said quantity at the previous sampling time $T_{i-1}$, setting $P_0$ equal to a predetermined value (for example zero) at time $T_i=0$; and the value of a mobile sum $S_i$ of M addends with M greater than or equal to 2 and i greater than or equal to M, the M addends representing said differences $\Delta_i, \Delta_{i-1}, \ldots \Delta_{i-M+1}$, at the current sampling time $T_i$ and at the previous M−1 sampling times $T_{i-1}, \ldots T_{i-M+1}$.

The mobile sum at the sampling time $T_i$ is defined by the following relationship:

$$S_i = \sum_{j=i-M+1}^{j=i} \Delta_j$$

The method also provides to compare the value of the mobile sum $S_i$ determined with at least one threshold value.

The differences $\Delta_i$ are determined in absolute value (in other words by adding always positive values irrespective of the direction of the displacements) so as to amplify the value of the parameter $S_i$.

Figure 3:
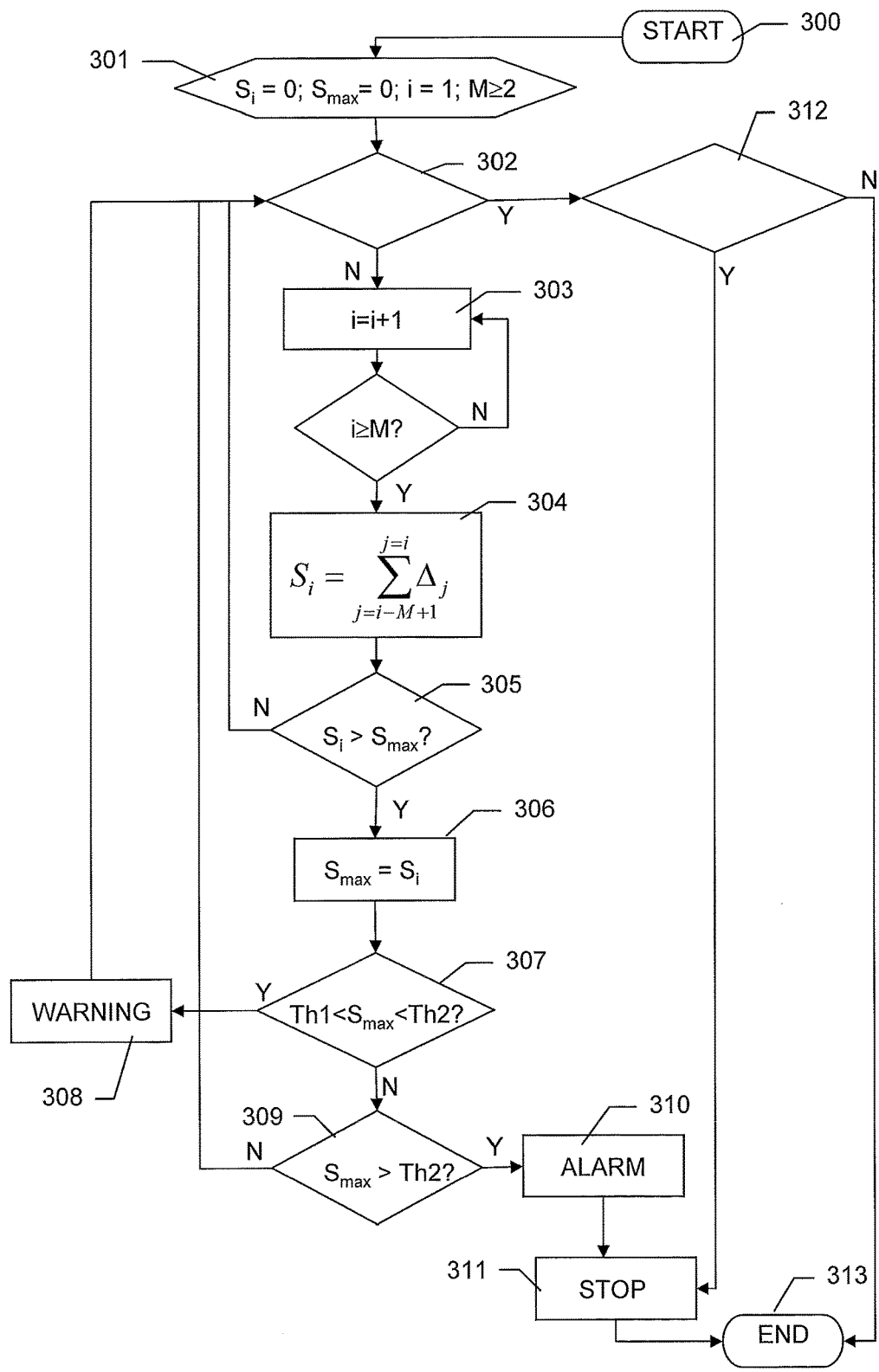
FIG. 3 schematically shows a flow chart of a preferred embodiment of an algorithm that can be used to carry out the control method of the invention.

FIG. 3 shows a flow chart of an algorithm that can be used to carry out the control method of the invention, according to a preferred embodiment.

Preferably, said component of the tire is made from elastomeric material not reinforced with cords.

Preferably, the algorithm is repeated for each component of the tire.

More preferably, the algorithm is repeated for each component of the tire made from elastomeric material not reinforced with cords manufactured in the work station.

The algorithm starts at block 300, at the stat of the manufacturing of each tire component. At block 301 the values taken up by two parameters $S_i$, $S_{max}$ are zeroed, the parameter i is set equal to 1 and the number of addends M of the mobile sum $S_i$ is set.

At block 302 it is checked whether the manufacturing process of the tire component has ended. In the affirmative case, at block 312 it is checked whether in the process just ended a warning signal has been generated. In the positive case, at block 311 the manufacturing process in the work station is interrupted. This can allow, for example, an operator to verify the possible presence of a deposition anomaly of the continuous elongated element 3 on the forming support 2 and the possible need to discard the tire with the component being manufactured. The algorithm ends at block 313 to then start again with the manufacturing of the component for another tire.

If at block 302 the manufacturing process of the tire component has not ended, at block 303, the value of the parameter i is set to the value i+1 (i=i+1). Thereafter, if i is greater than or equal to M the process proceeds with block 304, otherwise block 303 (i=i+1) is carried out again, and such an operation is then repeated until i is greater than or equal to M.

At block 304 the parameter $S_i$ is set to the value of the mobile sum at sampling time $T_i$, determined through the relationship described above. At block 305 the current value of the mobile sum $S_i$ is compared with the current value of the parameter $S_{max}$. If the current value of the mobile sum $S_i$ is less than or equal to the current value of the parameter $S_{max}$, the algorithm goes back to block 302. If the current value of the mobile sum $S_i$ is greater than the current value of the parameter $S_{max}$, at block 306 the parameter $S_{max}$ is assigned the current value of the mobile sum $S_i$. The value taken up by the parameter $S_{max}$ is therefore representative of the maximum value reached by the mobile sum during the manufacturing of the tire component.

At block 307 the current value taken up by the parameter $S_{max}$ is compared with two threshold values Th1 and Th2, with Th1<Th2. If the current value taken up by the parameter $S_{max}$ is greater than the first threshold value Th1 and less than the second threshold value Th2, at block 308 a warning signal is generated and the algorithm goes back to block 302. The warning signal can, for example, provides that an indicator light is switched on at the apparatus 1.

At block 309 the current value taken up by the parameter $S_{max}$ is compared with the second threshold value Th2. If the current value taken up by the parameter $S_{max}$ is not greater than the second threshold value Th2, the algorithm goes back to block 302. If the current value taken up by the parameter $S_{max}$ is greater than the second threshold value Th2, in block 310 an alarm signal is generated and at block 311 the manufacturing of the tire component is stopped immediately. The algorithm then ends at block 313.

The alarm signal can provides, for example, that both the indicator light and an alarm siren are switched on at the apparatus 1. At this point an operator can, for example, give for sure the presence of a deposition anomaly of the continuous elongated element 3 on the forming support 2 and decide to discard the tire with the component being manufactured. This advantageously makes it possible to avoid waste of material and unproductive use of the machinery of the production plant and to ensure ever greater quality levels in the tires manufactured.

Figure 4:
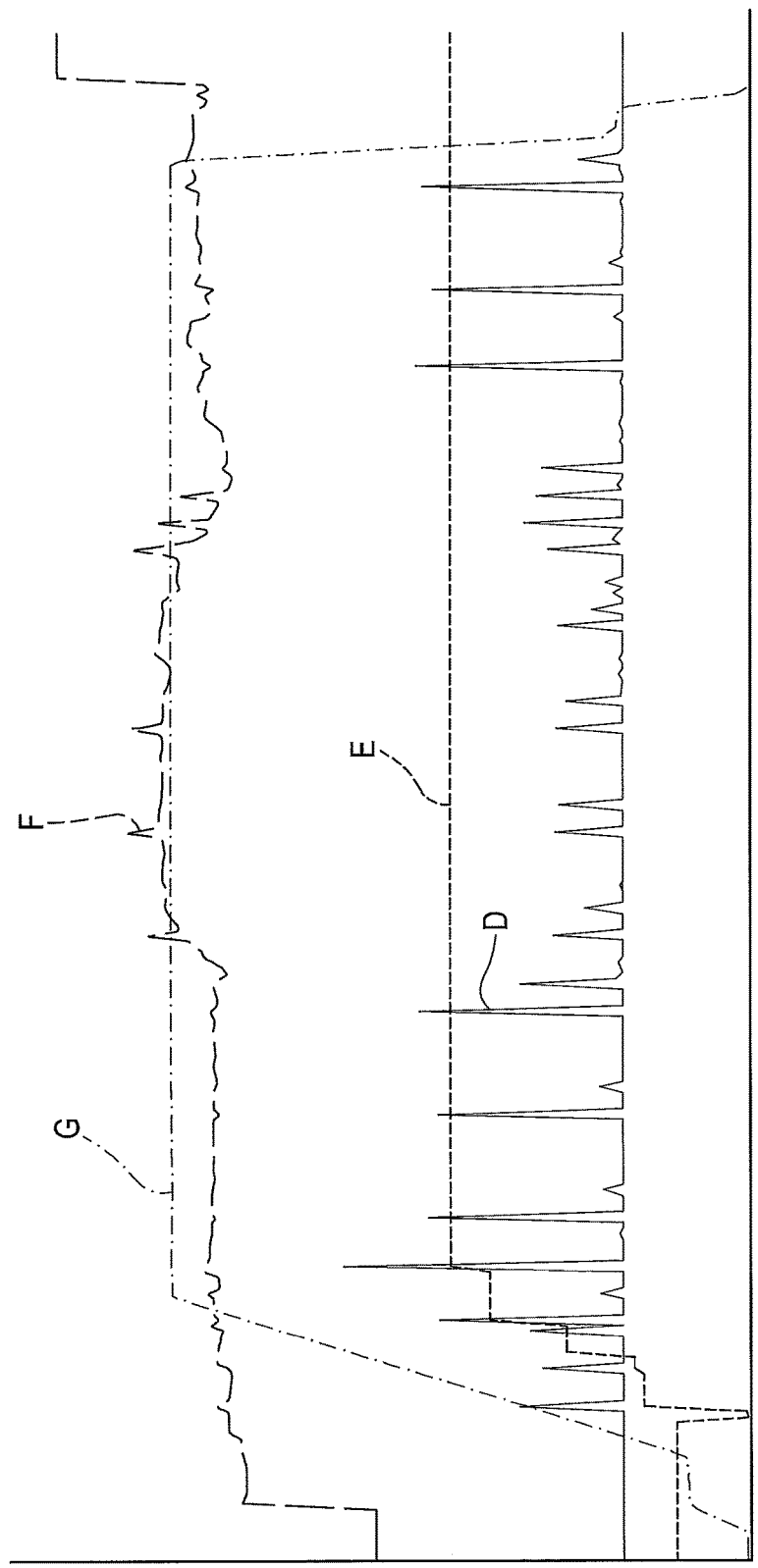
FIGS. 4 and 5 schematically show the results obtained by the Applicant in the presence and in the absence, respectively, of deposition anomalies, carrying out the algorithm of FIG. 3.
Figure 5:
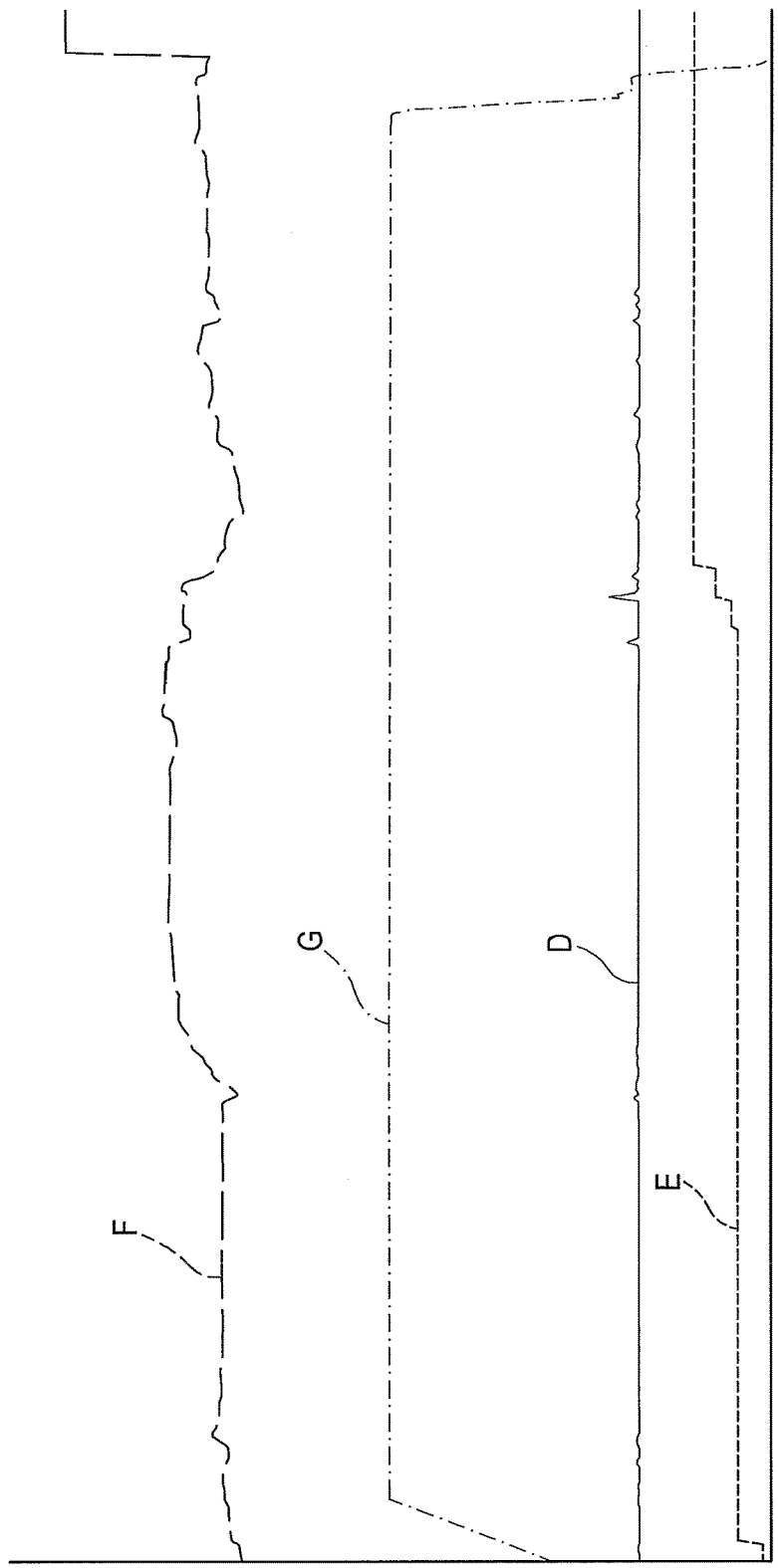

FIGS. 4 and 5 schematically show (not to scale) the results obtained by the Applicant in the presence and absence, respectively, of deposition anomalies, carrying out the algorithm of FIG. 3 and using: a sampling frequency of 100 Hz, a feeding flow rate of the continuous elongated element 3 of about 35 cm$^3$/s, a peripheral speed of the forming support of about 2 m/s, number M of addends equal to 4, first threshold value Th1 equal to 8 mm, second threshold value Th2 equal to 12 mm, diameter of the roller 8 equal to about 50 mm.

In such figures, the curve G represents the feeding speed of the continuous elongated element 3, the curve F represents the instantaneous position $P_i$ of the roller 8 along the application direction A, the curve D represents the instantaneous value of the mobile sum $S_i$, and the curve E represents the instantaneous value of the parameter $S_{max}$.

As can be seen in both figures, the curve of the parameter $S_{max}$ (curve E) continually rises, until the maximum is reached within the production cycle of the tire component in progress. In the cases analysed of FIGS. 4 and 5 the parameter $S_{max}$ respectively reached the peak value of 12 mm (above the second threshold value Th2) and of 2.8 mm (in other words below both threshold values Th1 e Th2).

Other simulations carried out by the Applicant showed peak values of the parameter $S_{max}$ greater than 8-9 mm in the case of presence of deposition anomalies and below 4-5 mm, in the case of absence of deposition anomalies (such values depend on the type of component in formation, for example for the tread band the values are higher, for the under-layer the values are lower). The Applicant has therefore experimentally found that it is possible to discriminate very clearly anomalous deposition cycles from regular cycles, through a suitable definition of the threshold values Th1 and Th2.

It should also be observed that in the case of FIG. 4 the parameter $S_{max}$ reaches its peak value of 12 mm at instantaneous values of the difference $\Delta_i$ and of the position $P_i$ of the roller 8, along the application direction A, that are little evident. This shows that the mobile sum $S_i$ advantageously makes it possible to correctly identify the deposition anomalies also for instantaneous values of $\Delta_i$ and $P_i$ that in themselves are not very significant.

In particular, the use of the mobile sum of several addends advantageously makes it possible to emphasise the value of the variations in position undergone by the roller 8 along the application direction A and to increase the ability to discriminate geometric irregularities due to deposition anomalies from the structural ones, intrinsically linked to the deposition process of the continuous elongated element 3.

Moreover, the use of many addends makes it possible, in the presence of an irregularity due to an excess or lack of material, to increase the probability that the comparison with the predetermined threshold value be carried out based on at least one addend that is representative of the variation of the position of the pressing member at such an irregularity. In other words, the probability of taking at least one sample $P_i$ that is indicative of the position of the pressing member at such an irregularity is increased.

Figure 6:
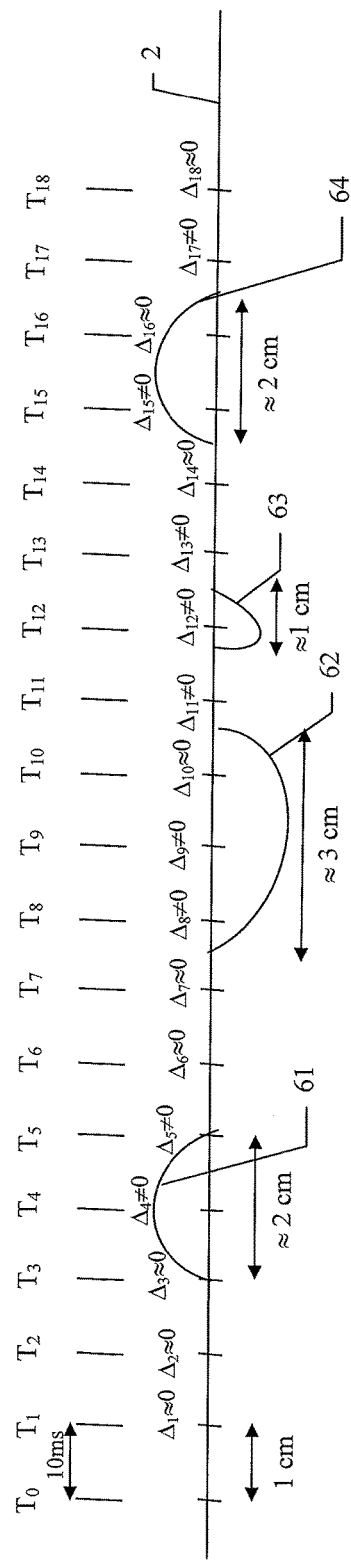
FIGS. 6 and 7 show two examples of positioning of the roller (down spatial frame) at the sampling times $T_i$ (top time frame) with respect to a plan development of the surface of the forming support 2 with geometric irregularities due to excess or lack of material, for values of the peripheral speed of the forming support respectively equal to 1 m/s and 2 m/s.

This is schematically exemplified in FIG. 6 in which an example of positioning of the roller 8 is shown (down spatial frame) at the sampling times $T_i$ (top time frame) with respect to a plan development of the surface of the forming support 2 with geometric irregularities due to excess material (schematically illustrated with peaks) or lack of material (schematically illustrated with troughs) of the continuous elongated element 3. FIG. 6 reproduces the case of a sampling frequency f of 100 Hz (1/T=10 ms) and a peripheral speed of the forming support 2 equal to 1 m/s so that the position of the roller 8 advances by 1 cm for each subsequent sampling time of 10 ms.

As schematically illustrated, in the example of FIG. 6 the roller 8 undergoes a variation of position at time $T_4$ with respect to the previous time $T_3$ ($\Delta_4 \neq 0$) and at the time $T_5$ with respect to the previous time $T_4$ ($\Delta_5 \neq 0$), due to the peak 61, and a variation of position at times $T_8$, $T_9$, $T_{11}$, $T_{12}$, $T_{13}$, $T_{15}$ and $T_{17}$, with respect to the previous times ($\Delta_8 \neq 0$, $\Delta_9 \neq 0$, $\Delta_{11} \neq 0$, $\Delta_{12} \neq 0$, $\Delta_{13} \neq 0$, $\Delta_{15} \neq 0$, $\Delta_{17} \neq 0$), due to the troughs 62, 63 and the peak 64.

It is clear that already with a number of addends M equal to 2 (see, for example, times $T_5$ and $T_9$ where, with M=2, $S_5=\Delta_4 \neq 0+\Delta_5 \neq 0$ and $S_9=\Delta_9 \neq 0+\Delta_9 \neq 0$) it is possible to benefit from the emphasising effect of the position differences $\Delta_i$ of the roller 8, that can be obtained with the mobile sum $S_i$ according to the invention, with respect to the case in which the value of only one difference $\Delta_i$ is considered. Moreover, it should be noted that the emphasising effect increases as the value of M increases (see, for example, times $T_{11}$, $T_{13}$ and $T_{17}$ where, with M=3, $S_{11}=\Delta_{11} \neq 0+\Delta_{10} \approx 0+\Delta_9 \neq 0$; $S_{13}=\Delta_{13} \neq 0+\Delta_{12} \neq 0+\Delta_{11} \neq 0$ and $S_{17}=\Delta_{17} \neq 0+\Delta_{16} \approx 0+\Delta_{15} \neq 0$). As the value of M increases, the probability of considering at least two $\Delta_i$ different from zero in the mobile sum indeed increases.

The value of M is preferably at least equal to two and, more preferably, at least equal to 3.

The Applicant has also found that values of M that are too high risk triggering a filtering effect so that it is no longer possible to notice significant variations in the value of the current mobile sum $S_i$. The value of M is, therefore, preferably less than or equal to 5.

Figure 7:
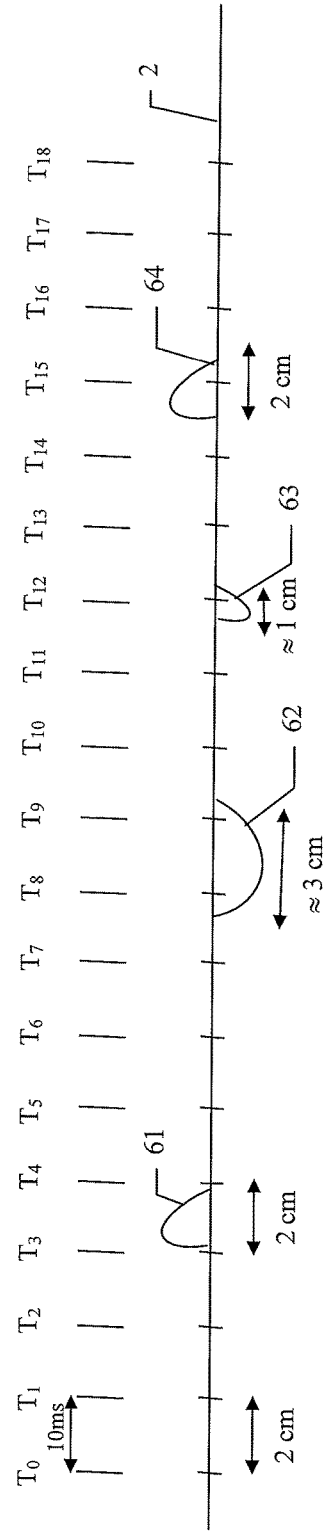

FIG. 7 shows an example similar to that of FIG. 6 where a peripheral speed of the forming support 2 equal to 2 m/s is considered so that the position of the roller 8 advances by 2 cm at each successive sampling time of 10 ms.

As can be seen from a comparison between the examples of FIGS. 6 and 7, for the same sampling frequency, the discriminatory ability of the method for identifying deposition anomalies increases as the peripheral speed of the forming support 2 decreases; or, vice-versa, for the same peripheral speed of the forming support 2, the discriminatory ability of the method for identifying deposition anomalies increases as the sampling frequency increases.

The Applicant also observes that, once the sampling frequency f and the peripheral speed of the forming support 2 have been set, the aforementioned discriminatory ability is greater for geometric irregularities having circumferential dimensions at least equal to the portion traveled by the roller 8 between one sample and the other (in other words, in time T=1/f). When the circumferential dimensions of the geometric irregularities are at least equal to the portion traveled by the roller 8 between on sample and the other, it indeed becomes possible to take at least two consecutive samples at such irregularities.

The invention claimed is:

1. A method for controlling a manufacturing process of a component of a tire for vehicle wheels, wherein at least one continuous elongated element fed by a supplying member is placed on a forming support by means of at least one pressing member active on said at least one continuous elongated element along an application direction, comprising, during the manufacturing of the component of the tire:
   a) acquiring at successive sampling times $T_i$, a value $P_i$ of a quantity indicative of a position of the pressing member along the application direction, where i is an integer greater than or equal to 1, $T_i=i*1/f$, and f is a sampling frequency and, at each sampling time $T_i$;
   b) determining a difference $\Delta_i$ in absolute value between the value of said quantity $P_i$, at the sampling time $T_i$, and a value $P_{i-1}$ of said quantity at the previous sampling time $T_{i-1}$;
   c) determining a value of a mobile sum $S_i$, of M addends with M greater than or equal to 2 and i greater than or equal to M, the M addends representing differences $\Delta_i$, $\Delta_{i-1}, \ldots \Delta_{i-M+1}$, at a current sampling time $T_i$, and at previous M-1 sampling times $T_{i-1}, \ldots {i-M+1}$; and
   d) comparing the value of the mobile sum $S_i$, determined with at least one threshold value, wherein, if the value of the mobile sum $S_i$, is greater than said at least one threshold value, at least one of the following is performed: generating a warning and/or alarm signal; checking for a possible presence of a deposition anomaly of the continuous elongated element on the forming support; checking for a possible need to discard the tire with the component being manufactured; and automatically stopping the manufacturing process.

2. The method according to claim 1, wherein said at least one threshold value provides for a first threshold value that is less than a second threshold value.

3. The method according to claim 2, wherein, if the value of the mobile sum $S_i$ is greater than the first threshold value and less than the second threshold value, at least one of the following is performed: generating a warning signal; checking for a possible presence of a deposition anomaly of the continuous elongated element on the forming support; checking for a possible need to discard the tire with the component being manufactured; and stopping the manufacturing process at the end of the manufacturing of the component being manufactured.

4. The method according to claim 2, wherein, if the value of the mobile sum $S_i$ is greater than the second threshold value, at least one of the following is carried out: generating an alarm signal; giving for sure a presence of a deposition anomaly of the continuous elongated element on the forming support; discarding the tire with the component being manufactured; and immediately stopping the manufacturing process.

5. The method according to claim 1, wherein the number M of addends of the mobile sum is 3 or 4.

6. The method according to claim 1, comprising comparing the value of the mobile sum $S_i$ with said at least one threshold value if the value of the mobile sum $S_i$ is greater than a value taken, at the current sampling time $T_i$, by a parameter $S_{max}$ that is representative of a maximum value reached by the mobile sum $S_i$ while the tire component is being manufactured.

7. The method according to claim 6, comprising, after c) determining a value of a mobile sum $S_i$ of M addenda, and before d) comparing the value of the mobile sum $S_i$, comparing the current value of the mobile sum $S_i$ with the current value taken by the parameter $S_{max}$.

8. The method according to claim 7, wherein, if the value of the mobile sum $S_i$ is greater than the current value taken by the parameter $S_{max}$, assigning the parameter $S_{max}$ the current value of the mobile sum $S_i$.

9. The method according to claim 7, wherein, if the value of the mobile sum $S_i$ is less than or equal to the current value taken by the parameter $S_{max}$, leaving the current value taken by the parameter $S_{max}$ unchanged.

10. The method according to claim 8, comparing the current value taken by the parameter $S_{max}$ with said at least one threshold value.

11. The method according to claim 10, wherein, if the current value taken by the parameter $S_{max}$ is greater than said at least one threshold value, at least one of the following is performed: generating a warning and/or alarm signal; checking for a possible presence of a deposition anomaly of the continuous elongated element on the forming support; checking for a possible need to discard the tire with the component being manufactured; and automatically stopping the manufacturing process.

12. The method according to claim 2, wherein the second threshold value is between about 130% and about 150% of the first threshold value.

13. The method according to claim 1, wherein the manufacturing of the component of the tire comprises supplying the continuous elongated element on the forming support for at least one first complete rotation of the forming support about its own rotation axis.

14. The method according to claim 1, wherein the sampling frequency f is greater than or equal to about 75 Hz.

15. The method according to claim 1, wherein said component of the tire is made from elastomeric material not reinforced with cords.

16. The method according to claim 1, wherein from a) to d) are repeated for each component of the tire.

17. The method according to claim 15, wherein from a) to d) are repeated for each component of the tire made from elastomeric material not reinforced with cords.

18. Equipment for controlling a manufacturing process of a component of a tire for vehicle wheels, comprising an apparatus for manufacturing said tire component and at least one processor operatively associated with said apparatus, said apparatus comprising:
  a supplying member configured to place a continuous elongated element on a forming support;
  a pressing member active on said continuous elongated element along an application direction so as to press said continuous elongated element on said forming support; and
  a detection device operatively coupled with said pressing member and configured to supply a quantity indicative of a position of the pressing member along the application direction during deposition of said continuous elongated element on said forming support;
  wherein said at least one processor is configured to:
  a) acquire, at successive sampling times $T_i$, a value $P_i$ of said quantity supplied by the detection device, where i is an integer greater than or equal to 1, $T_i=i*1/f$, and f is a sampling frequency and,
  at each sampling time $T_i$:
  b) determine a difference $\Delta_i$ in absolute value between the value $P_i$ of said quantity at the sampling time $T_i$, and a value $P_{i-1}$ of said quantity at the previous sampling time $T_{i-1}$;
  c) determine a value of a mobile sum $S_i$ of M addends with M greater than or equal to 2 and i greater than or equal to M, the M addends representing differences $\Delta_i$, $\Delta_{i-1}, \ldots \Delta_{i-M+1}$, at a current sampling time $T_i$ and at previous M−1 sampling times $T_{i-1}, \ldots T_{i-M+1}$; and
  d) compare the determined value of the mobile sum $S_i$ with at least one threshold value, wherein, if the value of the mobile sum $S_i$ is greater than said at least one threshold value, at least one of the following is performed: generating a warning and/or alarm signal; checking for a possible presence of a deposition anomaly of the continuous elongated element on the forming support; checking for a possible need to discard the tire with the component being manufactured; and automatically stopping the manufacturing process.

19. The equipment according to claim 18, wherein said at least one processor is configured to generate a warning and/or alarm signal.

20. The equipment according to claim 18, wherein said at least one processor is configured to automatically stop the apparatus for manufacturing said tire component.

21. The equipment according to claim 18, wherein said detection device is a linear transducer.

22. The equipment according to claim 18, wherein said pressing member comprises a roller adapted to rotate about a rotation axis thereof.

23. The equipment according to claim 22, wherein said pressing member comprises a support device of said roller configured so as to move said roller according to a linear motion along said application direction.

24. The equipment according to claim 23, wherein said detection device is a linear transducer operatively coupled with said support device, so as to move according to a linear motion along said application direction or a direction parallel to said application direction.

25. The equipment according to claim 23, wherein said support device of said roller comprises an air piston active on said roller.

26. The equipment according to claim 22, wherein said roller has a diameter between about 40 mm and about 60 mm.

27. The equipment according to claim 18, wherein said at least one processor is situated at least partially at the apparatus for manufacturing said tire component.

28. The equipment according to claim 18, wherein said at least one processor is situated, at least in part, in a remote location with respect to the apparatus for manufacturing said tire component.

* * * * *